Dec. 2, 1958 R. A. KRAFT 2,863,057
TELEVISION RECEIVER
Filed Oct. 10, 1955
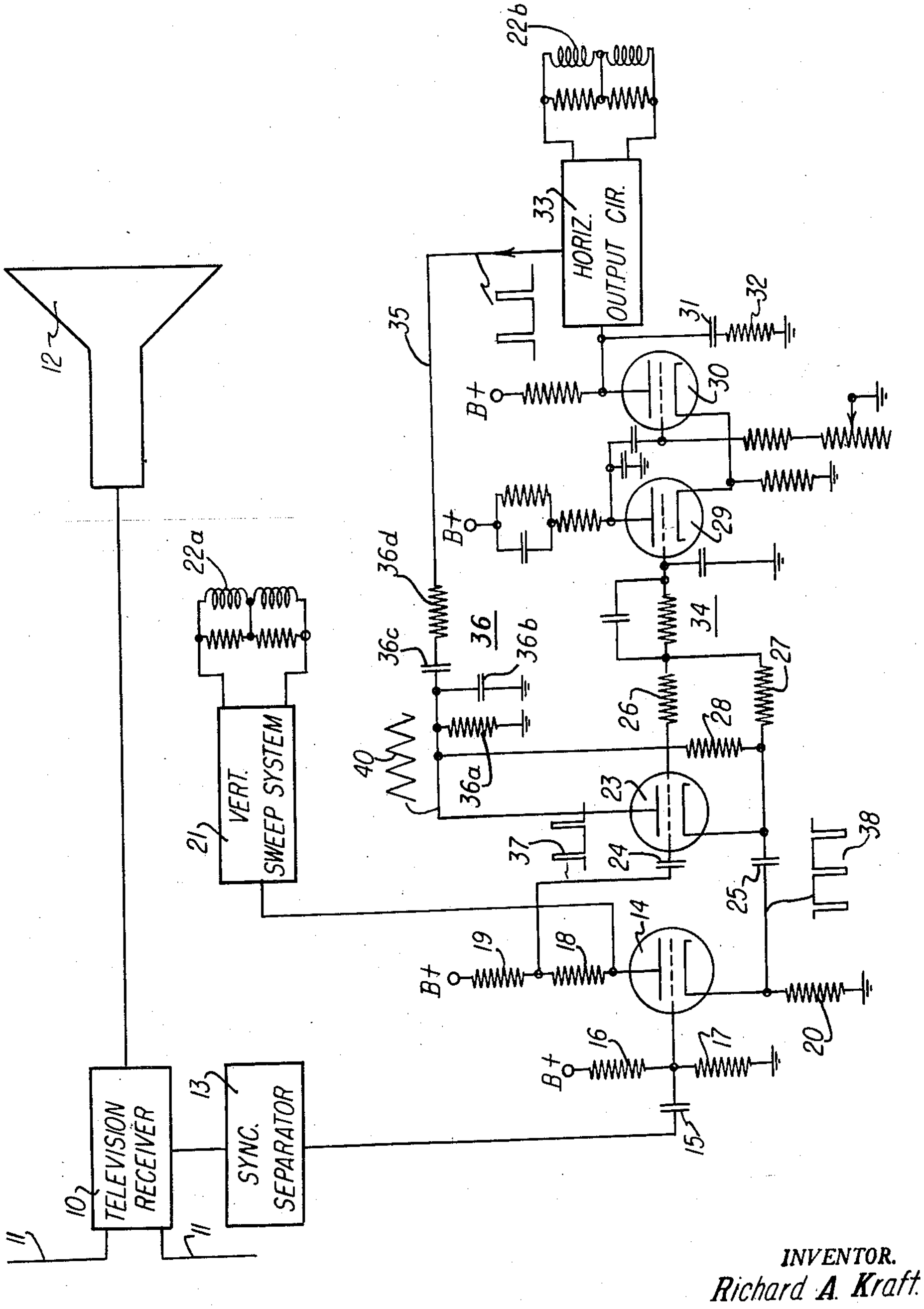
INVENTOR.
Richard A. Kraft
BY Mueller & Aichele
Attys.

United States Patent Office 2,863,057

Patented Dec. 2, 1958

2,863,057

TELEVISION RECEIVER

Richard A. Kraft, Elmhurst, Ill., assignor to Motorola, Inc., Chicago, Ill., a corporation of Illinois Application October 10, 1955, Serial No. 539,485

5 Claims. (Cl. 250—36)

The present invention relates to synchronizing systems and more particularly to an automatic frequency controlled synchronizing system of the type usually used in the horizontal sweep circuit of present day television receivers. This application is a continuation in part of my copending application Serial No. 479,388 filed January 3, 1955, now abandoned, and assigned to the present assignee.

It is usual in present day television receivers to provide an automatic frequency control (A. F. C.) circuit using the phase detector principle for synchronizing the horizontal scanning generator with the horizontal synchronizing pulse components of a received television signal. This A. F. C. circuit compares the phase of the sawtooth wave output signal of the scanning generator with the horizontal synchronizing pulses of the received television signal to produce a control voltage, and the control voltage is used to control the frequency of the scanning generator to hold the generator in synchronism with the received television signal.

Control circuits of the above type are relatively immune to noise disturbances, and synchronization is not entirely destroyed even during intervals when the synchronizing pulses of the received television signal are momentarily lost in background noise. This obtains because the frequency control exerted by the A. F. C. control circuit on the scanning generator depends upon the repetition of many regularly recurring pulses, and single pulses or random bursts of interference energy have little effect on the synchronized frequency of the generator. Control circuits of this A. F. C. type are generally known to the art and usually comprise a pair of diodes connected so that a balanced condition exists to random noise bursts and the like to minimize the effect of such bursts on the control of the scanning generator. In most instances, however, circuits incorporating a pair of diodes are relatively complicated and expensive, and many attempts have been made to devise A. F. C. control circuits for the horizontal scanning generator which utilize but a single triode rather than a pair of diodes.

Triode automatic frequency control circuits for horizontal synchronization have been successfully constructed, and these circuits have proved to be less complicated and less expensive than the double diode circuits discussed above. However, in most triode automatic frequency control circuits, the balance effect of the two diodes on noise disturbances is lost so that, even though the triode circuits are less expensive, they do not provide the high quality performance of the double diodes. Attempts have been made to construct an automatic frequency control circuit for horizontal synchronization in which a single triode is connected to constitute a balanced phase detector. One of the more successful of these, and one that is presently in wide-spread commercial use, is disclosed and claimed in Patent 2,645,717, which issued July 14, 1953, in the name of Albert W. Massman and which is assigned to the present assignee. It was found, however, that the usual double diode A. F. C. circuit of the type under discussion appeared to have more control voltage pull-in range than the Massman circuit and shorter charging time constants. The latter feature decreased the restoration time required for normal operation after each disturbance by the vertical synchronizing pulses. Copending application 479,388 referred to above, discloses a more recent embodiment of the Massman concept and which exhibits the high level performance of the double diode circuit yet retains the simplicity and inexpensiveness of the triode circuit.

A feature of the Massman type of A. F. C. horizontal synchronizing circuit is the provision of the control voltage that varies on either side of zero axis to control the frequency of the scanning generator, and which control voltage is returned to zero during a momentary interruption of the synchronizing pulses. This enables the scanning generator to continue to oscillate substantially at the horizontal synchronizing frequency during such interruption, and it is not pulled away from the synchronous frequency by spurious variations in the control voltage. The original Massman circuit has a tendency for the triode to conduct in the absence of synchronizing pulses, this conduction being due to the sawtooth signal derived from the output of the scanning generator and impressed on the plate of the triode used in the A. F. C. control circuit. Such conduction produces a spurious variation of the control voltage of zero with a corresponding undesired control effect on the frequency of the scanning generator tending to pull it away from the synchronous frequency. This tendency for the triode to conduct in the absence of synchronizing components is prevented in the circuit of the Massman patent by a somewhat complicated feedback circuit that returns an opposite polarity sawtooth wave to the grid of the triode and which opposes any conductive tendencies due to the sawtooth on the plate in the absence of the synchronizing pulses.

It is a general object of the present invention to provide an improved television A. F. C. synchronizing system that is eminently simple in its construction and which does not exhibit any tendency to produce spurious variations in the control signal developed thereby in the absence of synchronizing pulses.

Another object of the invention is to provide an improved triode A. F. C. synchronizing circuit of the general type disclosed in the Massman patent and in the copending Kraft application referred to previously herein, and which is constructed to have no tendency to produce a spurious control signal in the absence of synchronizing components applied thereto, this being achieved without the need for any extra or extraneous components or circuits.

A feature of the invention is the provision in an A. F. C. synchronizing circuit of a discharge device with its cathode returned through a resistor to its anode instead of to ground so that a portion of the sawtooth wave impressed on the anode is impressed on the cathode with the proper phase to oppose any tendency for current to flow in the device during the absence of synchronizing pulses, which current would produce a spurious control voltage.

The above and other features of the invention which are believed to be new are set forth with particularity in the appended claims. The invention itself, however, together with further objects and advantages thereof, may best be understood by reference to the following description when taken in conjunction with the accompanying drawing in which the single figure is a schematic representation of a television receiver incorporating the invention.

The invention provides a system for synchronizing a signal generator with a synchronizing signal and it comprises a phase splitter circuit including a discharge device having a first electrode connected through a first resistance means to a unidirectional potential source and also having a second electrode connected through a second resistance means to a point of reference potential. An electron control valve having at least three electrodes is provided. A first capacitor couples the first electrode of the phase splitter discharge device to a first of the electrodes of the valve, and a second capacitor couples the second electrode of the phase splitter discharge device to a second of the electrodes of the valve. Third resistance means interconnects the first and second electrodes of the valve, and fourth resistance means connects the second electrode of the valve to a third of the electrodes thereof. Means is provided for deriving an output signal from the signal generator and for applying the output signal to the third electrode of the valve, and means is coupled to an intermediate point on the third resistance means for deriving a control voltage for the signal generator.

The system of the figure includes a unit 10 which is designated as a television receiver and which has input terminals connected to a suitable antenna 11 and output terminals coupled to a cathode ray image reproducer or picture tube 12. The receiver 10 includes the usual radio frequency amplifier, first detector, intermediate frequency amplifier, second detector, video amplifier and sound stages of a television receiver. The receiver 10 is connected to a synchronizing signal separator 13 whose function is to separate the horizontal and vertical synchronizing pulses from a received television signal. Separator 13 is coupled to a phase splitter circuit which includes an electron discharge device 14, this coupling being made to the control electrode of device 14 through a coupling capacitor 15. The control electrode is connected to the common junction of a pair of series-connected resistors 16 and 17 which are connected as a potentiometer between the positive terminal B+ of a source of unidirectional potential and a point of reference potential or ground. This potentiometer provides a forced bias on the control electrode of device 14 to enable the device to function efficiently as a phase splitter and also to some extent as a clipper.

The anode of device 14 is connected through a pair of series-connected resistors 18, 19 to the positive terminal B+, and the cathode of this device is connected through a resistor 20 to the point of reference potential or ground. The anode is also connected to the vertical sweep system 21, and this sweep system has output terminals connected to the vertical deflection winding 22*a* of the reproducer 12.

Phase splitter discharge device 14 is also connected to the horizontal sweep system of the receiver which includes an electron discharge device or valve 23 connected as a phase detector. The common junction of resistors 18 and 19 is coupled to the control electrode of device 23 through a series-connected coupling capacitor 24 which, in accordance with the teaching of the aforementioned Kraft copending application, constitutes the sole external capacitor connected to the control electrode of device 23. The cathode of device 14 is coupled to the cathode of device 23 through a series-connected coupling capacitor 25 which, also in accordance with the teaching of aforementioned Kraft application, constitutes the sole capacitor connected to the cathode of device 23.

A pair of series-connected resistors 26, 27 connects the control electrode of device 23 to the cathode, and a further resistor 28 connects the cathode of this device to its anode.

The horizontal sweep system also includes a sawtooth wave generator which is shown as a multivibrator incorporating electron discharge devices 29 and 30. These devices are connected in known manner, and they generate a peaked sawtooth wave across the series combination of capacitor 31 and resistor 32, connected between the anode of device 30 and ground. The peaked sawtooth wave is supplied to the horizontal deflection winding 22*b* through a usual horizontal output circuit 33. The common junction of resistors 26 and 27 is connected through a filter network 34 to the control electrode of device 29. Relatively high amplitude pulses which may be considered an output signal from the generator 29, 30 and which have a fixed timing with respect to the sawtooth output wave produced across elements 31 and 32 appear on lead 35, and these pulses are integrated in filter network 36 and impressed as a sawtooth wave 40 on the anode of device 23. Filter 36 includes a resistor 36*a* shunted by a capacitor 36*b* and connected between the anode of device 23 and the point of reference potential, and it also includes a series capacitor 36*c* and resistor 36*d*.

The horizontal synchronizing wave from separator 13 is split into a positive going pulse wave 37 which is impressed on the control electrode of device 23 through capacitor 24, and into a negative going pulse waver 38 which is impressed on the cathode of device 23 through capacitor 25. The pulse waves 37 and 38 cause the control electrode of device 23 to draw grid current and bias that electrode negatively with respect to the cathode. This produces a negative potential across resistors 26 and 27 which holds over between the successive pulses of the waves 37, 38 due to the time constants of the resistant-capacity circuits 24, 26, 27, 28 and 25, 28.

At the same time, the sawtooth wave impressed on the anode of device 23 by filter 36, in conjunction with the waves 37, 38 produces a unidirectional intermittent space current in device 23 which develops a positive bias on the cathode having a value determined by the phase relation between the sawtooth wave and the synchronizing waves.

A positive bias is established, therefore, on the cathode of device 23 that varies in accordance with the phase variation between the output signal of generator 29, 30 and the incoming horizontal synchronizing pulses. A negative voltage is concomitantly established across resistors 26, 27 having an amplitude which is a function of the amplitude of the pulse waves 37, 38. This latter negative voltage is added to the positive cathode bias and resistors 26, 27 may be chosen so that the voltage appearing at their common junction varies on either side of the zero axis in accordance with the phase variations referred to above so as to provide a suitable control for the multivibrator sawtooth generator 29, 30. As noted in the Massman patent, resistors 26, 27 are preferably of equal value so that the waves 37 and 38 cancel thereacross together with any spurious signals or noise bursts that may be included in such waves.

As discussed in the Massman patent, it is most desirable during the momentary interruption of the horizontal synchronizing pulses that no potential be developed at the junction of resistors 26, 27. This is so that the generator 29, 30 will continue to operate substantially at the horizontal synchronizing frequency during such interruptions and will not be shifted from that frequency by the control circuit of device 23. To accomplish this desired condition, the Massman system included an additional circuit which supplied a sawtooth wave to the control grid of the phase detector device in opposite phase to the sawtooth wave impressed on the anode. As pointed out in the aforementioned copending Kraft application, this circuit not only increased the complexity of the system, to some extent, but also formed in effect a potential divider and attenuated the positive pulse wave 37 applied to the control grid of device 23 so as to impair somewhat the operation of the system.

In the copending Kraft application, the resistor 28 was connected from the cathode of the device 23 to ground. The sawtooth wave applied to the anode of device 23 was given a selected amplitude such that, in the absence of synchronizing pulses, the sawtooth wave had insufficient amplitude to cause sufficient current flow through the tube to overcome the contact potential of the control electrode; so that the resulting voltage supplied to the grid of tube 29 was essentially zero. However, this led to some difficulties in assuring that the correct amplitude for the sawtooth wave would be provided and retained in all receivers manufactured over a period of time.

In the present invention, and because resistor 28 from the cathode of device 23 is connected to the anode, a potential divider for the sawtooth wave 40 is formed by the elements 28, 25 and 20. This causes a small portion of the sawtooth wave to be impressed on the cathode of device 23 in proper phase to oppose the current flow through the device that may be caused by the sawtooth wave 40 on the anode during the interruption of the synchronizing pulses with corresponding interruption to the pulse waves 37, 38. This simple expedient, which requires no extra parts or circuits, was found completely to counteract any tendency for the circuit of device 23 to place a spurious positive potential on the lead connected to the grid of tube 29 during the momentary absence of synchronizing pulses. Therefore, it is not necessary to provide extra circuits or to control precisely the amplitude of the sawtooth wave 40 to assure that there will be no conduction in device 23 during intervals of loss of synchronizing pulses, and generator 29, 30 continues to operate substantially at the synchronous frequency during such intervals. The sawtooth wave applied through resistor 28 to the cathode of device 23 is not applied through resistors 26 and 27 to the grid of device 23 as the common junction between resistors 26 and 27 is connected to ground for alternating current through the capacitor connected from the common junction of resistors 26 and 27 to the grid of tube 29, and the capacitor connected from this grid to ground.

Since the resistance of resistor **36*a* in filter 36 is relatively low, and since the capacitive reactance of capacitor 36*b* in that filter is also relatively low, the anode of device 23 is substantially at D. C. and A. C. ground. Therefore, the return of resistor 28 to the anode of device 23** rather than to ground, as was done in the copending Kraft application and as in the Massman patent, has no appreciable effect on the basic function of the circuit.

The following value has been used in a constructed embodiment of the circuit and these are listed herein merely by way of example but are not intended to limit the invention in any way:

| | |
|---|---|
| Device **14** | ½ 6SN7. |
| Device **23** | ½ 6SN7. |
| B+ | 150 volts. |
| Resistor **18** | 6800 ohms. |
| Resistor **19** | 2700 ohms. |
| Resistor **20** | 2200 ohms. |
| Capacitor **24** | 470 micromicrofarads. |
| Capacitor **25** | 1,000 micromicrofarads. |
| Resistor **28** | 100,000 ohms 68,000 for perfect balance). |
| Resistor **26** | 100,000 ohms. |
| Resistor **27** | 100,000 ohms. |
| Resistor **36*a*** | 22,000 ohms. |
| Capacitor **36*b*** | 3,300 micromicrofarads. |
| Capacitor **36*c*** | .001 microfarads. |
| Resistor **36*d*** | 330,000 ohms. |

The invention provides, therefore, an improved television synchronizing system that is inexpensive in its construction and which provides more perfect balance than prior art systems of this general type.

I claim:

1. A system for synchronizing a signal generator with a synchronizing signal including in combination, a phase splitter circuit comprising a discharge device having a first electrode connected through first resistance means to a unidirectional potential source and further having a second electrode connected through second resistance means to a point of reference potential, an electron control valve having input, output and common electrodes, first capacitor means coupling said first electrode of said phase splitter discharge device to said input electrode of said valve, second capacitor means coupling said second electrode of said phase splitter discharge device to said common electrode of said valve, third resistance means interconnecting said input and common electrodes of said valve, fourth resistance means isolated from said point of reference potential connecting said common electrode of said valve to said output electrode thereof, means for deriving an output signal from the signal generator and for applying said output signal to said output electrode of said valve, and means coupled to an intermediate point on said third resistance means for deriving a control voltage for the signal generator.

2. A system for synchronizing a signal generator including in combination, a phase splitter circuit comprising an electron discharge device having an anode connected through a first resistance means to a unidirectional potential source and further having a cathode connected through a second resistance means to a point of reference potential, an electron discharge valve having an anode and a cathode and a control electrode, first capacitor means coupling said anode of said phase splitter discharge device to said control electrode of said valve, second capacitor means coupling said cathode of said phase splitter discharge device to said cathode of said valve, third resistance means interconnecting said control electrode and said cathode of said valve, fourth resistance means isolated from said point of reference potential connecting said cathode of said valve to said anode of said valve, means for deriving an output signal from the signal generator and for applying said output signal to said anode of said valve, with a portion of said output signal being applied through said fourth resistance means to said cathode of said valve, and means coupled to an intermediate point on said third resistance means for deriving a control voltage for the signal generator.

3. A system for synchronizing a signal generator with a synchronizing signal including in combination, a phase splitter circuit comprising an electron discharge device having an anode connected through a first resistance means to a unidirectional potential source and further having a cathode connected through a second resistance means to a point of reference potential, an electron discharge valve having an anode and a cathode and a control electrode, means including a first series-connected coupling capacitor coupling said anode of said phase splitter discharge device to said control electrode of said valve and said first capacitor constituting the sole external capacitor connected to said control electrode of said valve, means including a second series-connected coupling capacitor coupling said cathode of said phase splitter discharge device to said cathode of said valve and said first capacitor constituting the sole external capacitor connected to said cathode of said valve, first and second series-connected resistors interconnecting said control electrode and said cathode of said valve, a further resistor isolated from said point of reference potential connecting said cathode of said valve to said anode thereof, means for deriving a sawtooth signal from the signal generator and for applying such sawtooth signal to the anode of said valve, and means connected to the common junction of said first and second series-connected resistors for deriving a control voltage for the signal generator, said last named means providing an alternating current path from the junction of said first and second series connected resistors to said reference potential.

4. A system for synchronizing a signal generator with a synchronizing signal including in combination, a phase splitter circuit comprising a discharge device having a first electrode connected through a first resistance means to a unidirectional potential source and further having a second electrode connected through a second resistance means to a point of reference potential, an electron control valve having cathode, grid and anode electrodes, first capacitor means coupling said first electrode of said phase splitter discharge device to said grid electrode of said valve, second capacitor means coupling said second electrode of said phase splitter discharge device to said cathode electrode of said valve, third resistance means interconnecting said grid and cathode electrodes of said valve, fourth resistance means connecting said cathode electrode of said valve to said anode electrode thereof, means for deriving an output signal from the signal generator and for applying said output signal to said anode electrode of said valve, said fourth resistance means applying a portion of said output signal to said cathode electrode of said valve, and means coupled to an intermediate point on said third resistance means for deriving a control voltage for the signal generator, said last named means providing an alternating current path from said intermediate point to said reference potential so that said output signal is not applied through said third resistance means to said grid electrode.

5. A system for synchronizing a signal generator with a synchronizing signal including in combination, an electron control valve having cathode, grid and anode electrodes, a phase splitter circuit responsive to the synchronizing signal for producing a pair of oppositely phased control signals, a connection including a first series coupling capacitor extending from said phase splitter circuit to said grid electrode for applying one of said control signals thereto and constituting the sole external capacitor coupled to said grid electrode, a further connection including a second series coupling capacitor extending from said phase splitter circuit to said cathode electrode for applying the other of said control signals thereto and constituting the sole external capacitor coupled to said cathode electrode, resistance means connected from said grid electrode to said cathode electrode and further resistance means connected from said cathode electrode to a point of fixed reference potential, said control signals establishing a first bias on said grid electrode with respect to said cathode electrode, means for deriving an output signal from the signal generator and for applying said output signal to said anode electrode so that conduction of said control valve provides a second bias with respect to said point of reference potential on said cathode electrode with said second bias having a value dependent on the phase relation between said output signal and said synchronizing signal, and means coupled to an intermediate point on said first named resistance means for developing a control voltage derived from said first and second biases varying in amplitude about a selected potential axis in response to phase variations of said output signal with respect to said synchronizing signal to control the frequency of said generator.

References Cited in the file of this patent

UNITED STATES PATENTS 2,645,717 Massman -------------- July 14, 1953